United States Patent
Vui et al.

(10) Patent No.: US 12,332,729 B2
(45) Date of Patent: Jun. 17, 2025

(54) CONTENT-RICH ERROR NOTIFICATION

(71) Applicant: Western Digital Technologies, Inc., San Jose, CA (US)

(72) Inventors: Kan Lip Vui, Singapore (SG); Judah Gamliel Hahn, Ofra (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 267 days.

(21) Appl. No.: 17/875,741

(22) Filed: Jul. 28, 2022

(65) Prior Publication Data

US 2024/0036960 A1 Feb. 1, 2024

(51) Int. Cl.
G06F 11/07 (2006.01)
G06F 13/42 (2006.01)

(52) U.S. Cl.
CPC ........ *G06F 11/076* (2013.01); *G06F 11/0745* (2013.01); *G06F 11/0772* (2013.01); *G06F 13/4221* (2013.01); *G06F 2213/0026* (2013.01)

(58) Field of Classification Search
CPC .............. G06F 11/076; G06F 11/0745; G06F 11/0772; G06F 13/4421; G06F 2213/0026
See application file for complete search history.

(56) References Cited

U.S. PATENT DOCUMENTS

| | | | |
|---|---|---|---|
| 8,787,155 B2 | 7/2014 | Chencinski et al. | |
| 10,019,388 B2 | 7/2018 | Long et al. | |
| 10,585,822 B2 | 3/2020 | Lee et al. | |
| 10,942,800 B2 | 3/2021 | Yun et al. | |
| 2008/0002336 A1* | 1/2008 | Zimmerman | H01L 25/50 361/600 |
| 2008/0256400 A1* | 10/2008 | Yang | G06F 11/0781 714/57 |
| 2012/0322492 A1* | 12/2012 | Koo | H04B 7/0417 455/517 |
| 2013/0007489 A1 | 1/2013 | Unnikrishnan et al. | |
| 2013/0054851 A1 | 2/2013 | Barbiero et al. | |
| 2015/0058666 A1* | 2/2015 | Guo | G06F 11/0721 714/10 |
| 2016/0335220 A1* | 11/2016 | Breakstone | G06F 1/185 |
| 2019/0114220 A1 | 4/2019 | Stenfort | |
| 2020/0151048 A1* | 5/2020 | Shantamurthy | G06F 9/4806 |
| 2020/0387460 A1 | 12/2020 | Lin et al. | |
| 2021/0157762 A1 | 5/2021 | Kwon et al. | |
| 2021/0271537 A1* | 9/2021 | Gong | G06F 13/4295 |

FOREIGN PATENT DOCUMENTS

| | | |
|---|---|---|
| CN | 111858148 A | 10/2020 |
| CN | 113114595 A | 7/2021 |

* cited by examiner

*Primary Examiner* — Jigar P Patel
(74) *Attorney, Agent, or Firm* — PATTERSON + SHERIDAN, LLP

(57) ABSTRACT

A data storage device includes a controller. The controller is coupled to a host device. The controller is configured to determine a quality of a peripheral component interconnect express (PCIe) link, wherein the quality of the PCIe link is either greater than or less than a threshold quality, and transmit an error notification to the host device via a sideband when the quality of the PCIe link is less than the threshold quality. The sideband is a different communication channel than the PCIe link. The error notification includes additional information regarding events occurring in the data storage device resulting in the quality of the PCIe link.

18 Claims, 4 Drawing Sheets

CONTENT-RICH ERROR NOTIFICATION

BACKGROUND OF THE DISCLOSURE

Field of the Disclosure

Embodiments of the present disclosure generally relate to data storage devices, such as solid state drives (SSDs), and, more specifically, reporting errors, to a host device in a peripheral component interconnect (PCI) express (PCIe) link between the host device and a data storage device, where the data storage device and the host device are coupled together.

Description of the Related Art

The PCIe link is a primary communication link between a data storage device and a host device, where the data storage device and host device are coupled together. The PCIe link is a complex serial data communication link, which may require link negotiation to establish lane width and speed. Errors arising from PCIe link negotiation and/or signal integrity may result in the host device assuming that the data storage device is not present in the computing system. These errors may be catastrophic to the operation of the computing system, where the errors may cause the host device to fail to boot or cause an operating system crash when the data storage device is a boot device. In other words, the required data (e.g., boot data) may not be sent to the host device from the data storage device since the host device may not detect that the data storage device is present in the computing system.

In the example above, the failure to boot or operating system crash may be a result of the host device not being able to initiate a transaction (e.g., read/write commands). The PCIe protocol is a command-response protocol, where the host device initiates transactions. The host device transmits commands to the data storage device and expects a response from the data storage device, where the response is associated with a transmitted command. If the responses are not received or unintelligible responses are received, the host device may retry the transaction by re-transmitting the commands associated with the failed responses. After a predetermined number of transaction retries, the host device gives up and declares the data storage device missing.

Therefore, there is need in the art to transmit, from a data storage device to a host device, where the data storage device is coupled to the host device, a meaningful error notification to the host device via a communication channel other than the PCIe link.

SUMMARY OF THE DISCLOSURE

The present disclosure generally relates to data storage devices, such as solid state drives (SSDs), and, more specifically, reporting errors, to a host device in a peripheral component interconnect (PCI) express (PCIe) link between the host device and a data storage device, where the data storage device and the host device are coupled. A data storage device includes a controller. The controller is coupled to a host device. The controller is configured to determine a quality of a peripheral component interconnect express (PCIe) link, wherein the quality of the PCIe link is either greater than or less than a threshold quality, and transmit an error notification to the host device via a sideband when the quality of the PCIe link is less than the threshold quality. The sideband is a different communication channel than the PCIe link. The error notification includes additional information regarding events occurring in the data storage device resulting in the quality of the PCIe link.

In one embodiment, a data storage device includes a controller. The controller is coupled to a host device. The controller is configured to determine a quality of a peripheral component interconnect express (PCIe) link, wherein the quality of the PCIe link is either greater than or less than a threshold quality, and transmit an error notification to the host device via a sideband when the quality of the PCIe link is less than the threshold quality.

In another embodiment, a data storage device includes a controller. The controller is coupled to a host device. The controller includes an error detection module and an error reporting module coupled to the error detection module. The error detection module is configured to detect transmission errors in a peripheral component interconnect express (PCIe) link between the host device and the data storage device. The error reporting module is configured to collect the detected transmission errors from the error detection module, determine a quality of the PCIe link based on the collected detected transmission errors, wherein the quality of the PCIe link is either greater than or less than a threshold quality, and transmit an error notification to the host device through a sideband when the quality of the PCIe link is less than the threshold quality.

In another embodiment, a data storage device includes means for detecting a quality of a peripheral component interconnect express (PCIe) link between the data storage device and a host device coupled to the data storage device and means for transmitting an error notification to the host device via a sideband distinct from the PCIe link.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, reporting errors, to a host device in a peripheral component interconnect (PCI) express (PCIe) link between the host device and a data storage device, where the data storage device and the host device are coupled. A data storage device includes a controller. The controller is coupled to a host device. The controller is configured to determine a quality of a peripheral component interconnect express (PCIe) link, wherein the quality of the PCIe link is either greater than or less than a threshold quality, and transmit an error notification to the host device via a sideband when the quality of the PCIe link is less than the threshold quality. The sideband is a different communication channel than the PCIe link. The error notification includes additional information regarding events occurring in the data storage device resulting in the quality of the PCIe link.

Figure 1:
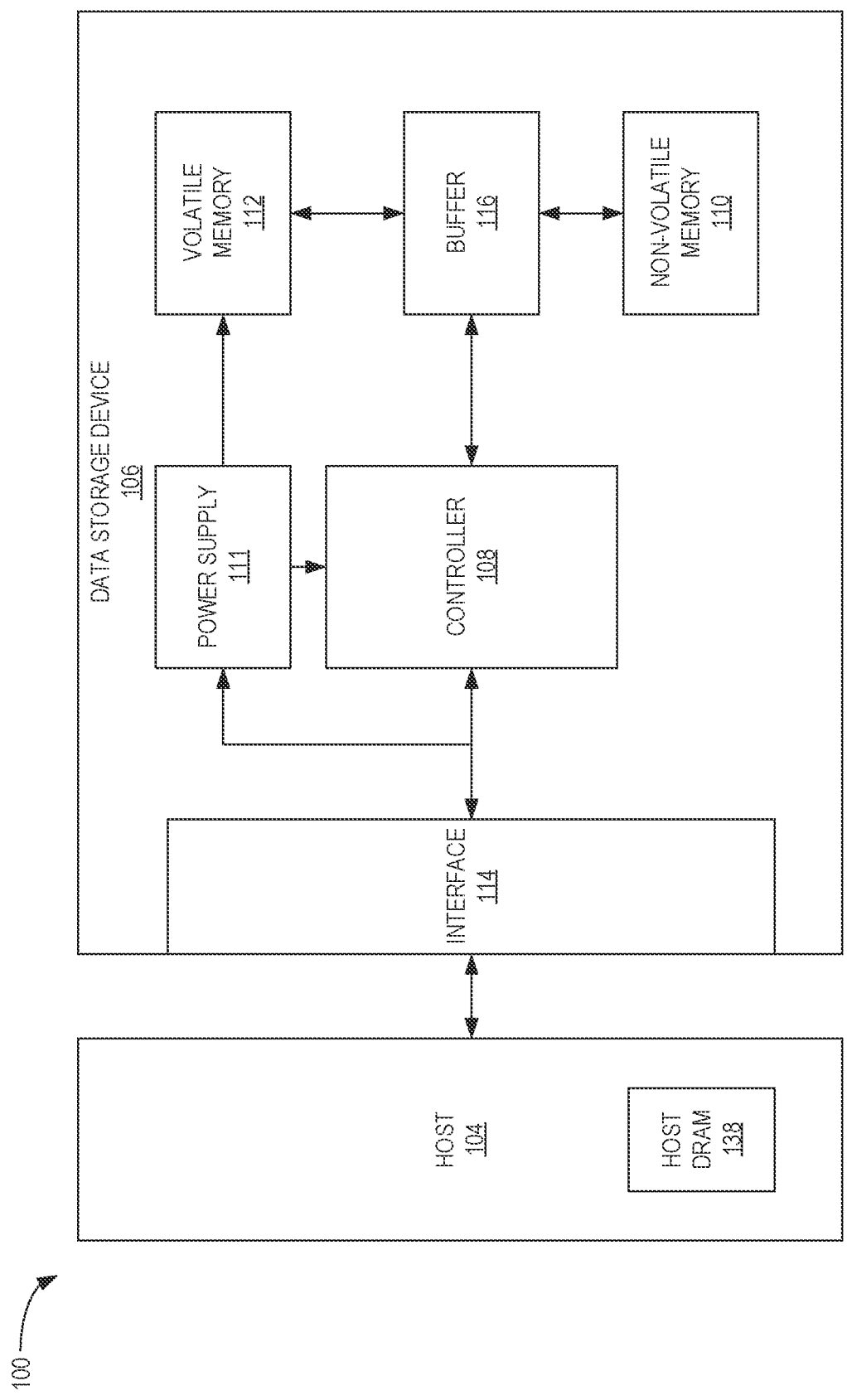
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
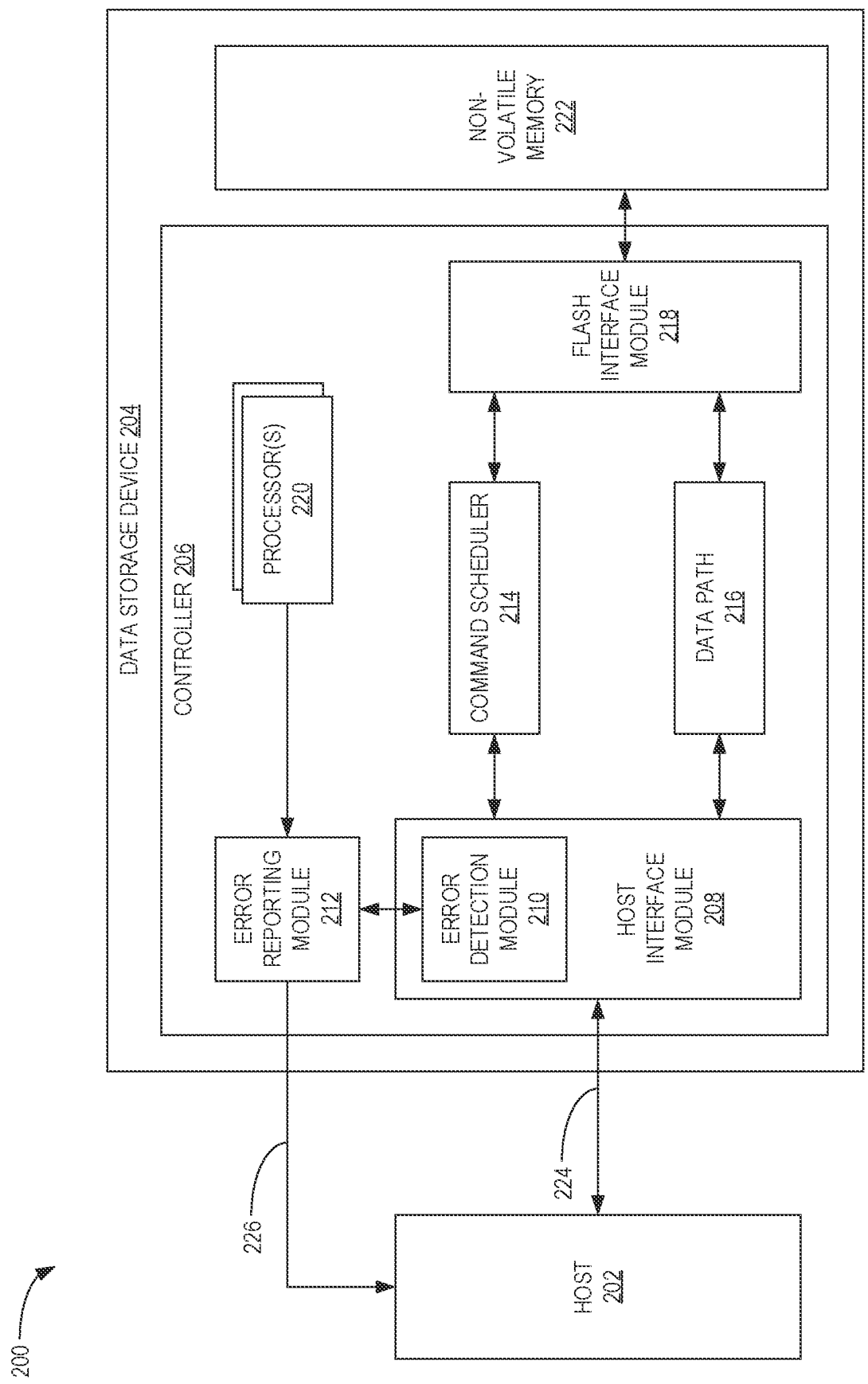
FIG. 2 is a schematic block diagram illustrating a storage system in which a data storage device may communicate with a host device that is coupled to the data storage device when a peripheral component interconnect (PCI) express (PCIe) link is operating sub-optimally, according to certain embodiments.

FIG. 2 is a schematic block diagram illustrating a storage system 200 in which a data storage device 204 may communicate with a host device 202 that is coupled to the data storage device 204 when a peripheral component interconnect (PCI) express (PCIe) link 224 is operating sub-optimally, according to certain embodiments. Aspects of the storage system 200 may be similar to aspects of the storage system 100 of FIG. 1. It is to be understood that the described embodiments may be applicable to computing systems having a controller that provides meaningful feedback about a communication link between a host device and the controller.

The data storage device 204 includes a controller 206 and an NVM 222. The controller 206 includes a host interface module (HIM) 208, an error reporting module 212, a command scheduler 214, a data path 216, a flash interface module (FIM) 218, and one or more processors 220. The HIM 208 is coupled to the host device 202, such that the host device 202 may send data and commands to the controller 206 via the PCIe link 224 coupling the HIM 208 to the host device 202 or that the controller 206 may fetch data and commands from the host device 202 via the PCIe link 224 coupling the HIM 208 to the host device 202.

The HIM 208 includes an error detection module 210. The error detection module 210 may be configured to detect errors in the PCIe link 224. It is to be understood that the errors may be NVMe errors. The error detection module 210 may collect events regarding the detected errors and provide the collected events and/or detected errors to the error reporting module 212. For example, the detected errors may include receiving a plurality of PCIe packets from the host device 202 that have been responded to by the data storage device 204 previously, an amount of transmission noise that is greater than a threshold allowance for transmission noise, and the like. The error reporting module 212 may be configured to transmit an error notification or error indication to the host device 202 via a communication link 226, where the communication link 226 is distinct from the PCIe link 224. For example, the communication link 226 may be a sideband bus, where the sideband bus is either a system management (SM) bus, a distributed antenna system (DAS) signal, a general purpose input/output (GPIO) signal, or an improved inter-integrated circuit (I3C) signal. It is to be understood that other sideband buses not listed may be applicable to the described embodiments.

The one or more processors 220 may generate information regarding the errors, such as what caused the error, when the error occurred, what components are impacted by the error, and the like. The generated information may be provided to the error reporting module 212 and sent to the host device 202 when sending the associated error notification or error indication. In some embodiments, the generated information is not sent with the error notification, but after the error notification has been sent. Furthermore, the error notification may include one or more of error codes associated with the quality of the PCIe link 224, an indication to recalibrate a receiver (RX) equalizer of the host device 202, an indication to reinitialize the PCIe link 224, diagnostic data associated with the PCIe link 224, an indication to power cycle reset the data storage device 204, and the like. In some examples, the error notification may be transmitted as a predefined sequence of pulses that corresponds to an error type previously communicated to the host device 202. It is to be understood that the previously listed examples of responses and/or error codes is not intended to be limiting, but to provide examples of possible embodiments.

Furthermore, because the error notification is sent via the communication link 226, the error notification may be received by the host device 202 even though the PCIe link 224 is not operating correctly, such that the data storage device 204 appears unresponsive to the host device 202. In some examples, the host device 202 may use the NVMe-management interface (MI) over Management Component Transport Protocol (MCTP) protocol for out of band communication (i.e., sideband communication) (e.g., the communication link 226). Features such as vital product data (VPD) and NVMe log pages may be used in order to communicate the status of the data storage device 204 following a successful alert from the data storage device 204 to the host device 202. Additionally, specific PCIe diagnostic data may be passed to the host device 202, which may allow for diagnostic tools on the host device 202 side to adjust for PCIe link and protocol-level (e.g., PCIe protocol/NVMe protocol) issues.

The command scheduler 214 may be configured to schedule and process read and write commands to the NVM 222 based on received read and write commands from the host device 202. The command scheduler 214 sends the scheduled and processed read and write commands to the FIM 218, where the FIM 218 accesses the NVM 222 to read data from and write data to the NVM 222. The data path 216 may include error correction code (ECC) engines, encryption/decryption modules, encoder/decoders, and the like. Data to be programmed to the NVM 222 is processed via the data path 216 and data that is read from the NVM 222 is processed via the data path 216. For example, write data associated with a received write command may be encrypted, encoded, and provided with ECC code prior to programming the write data to the NVM 222. Likewise, data read from the NVM 222 is decoded, decrypted, and processed using the ECC engine prior to providing the data read from the NVM 222 to the host device 202.

Figure 3:
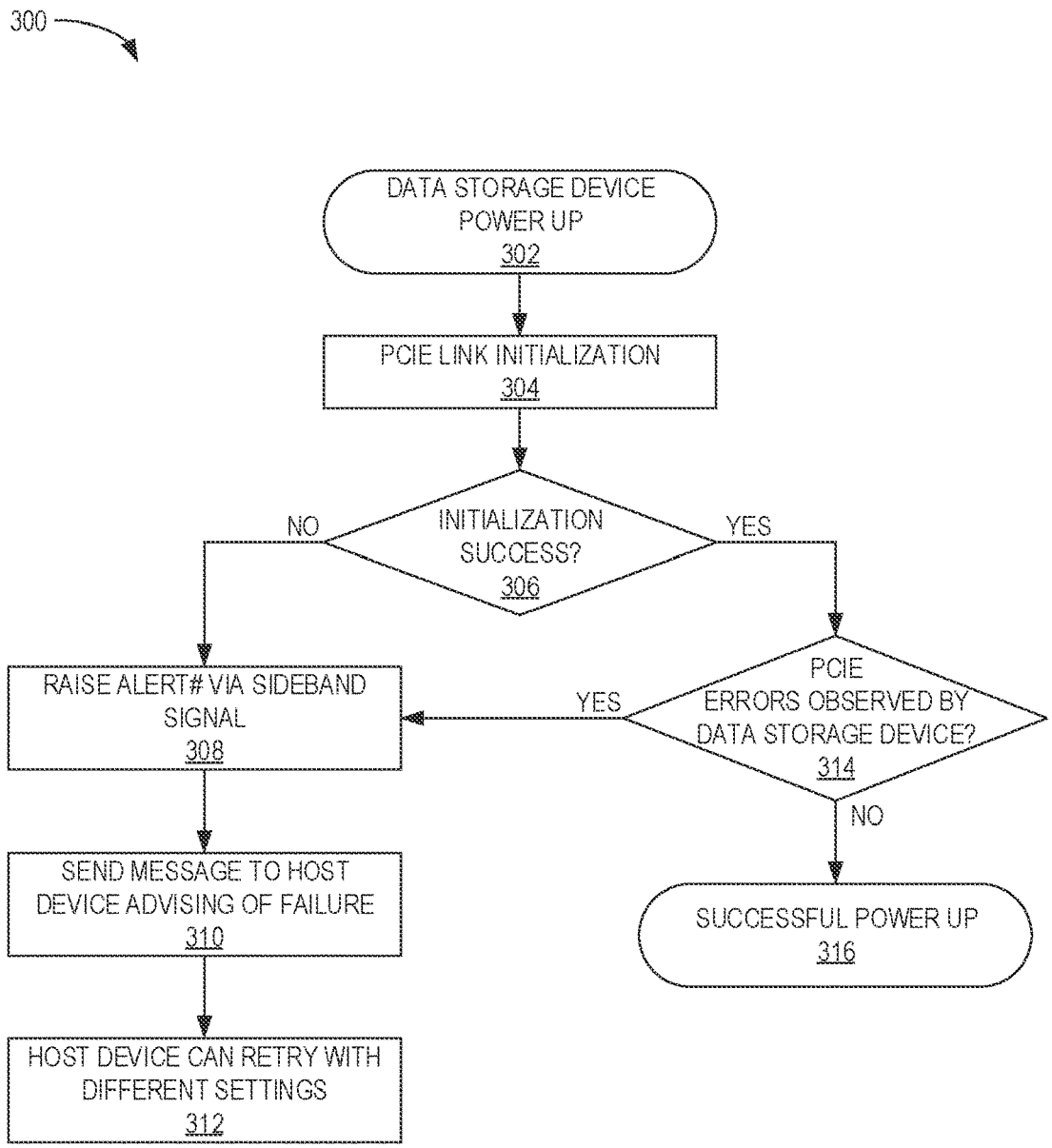
FIG. 3 is a flow diagram illustrating a method of error reporting to a host device when a PCIe link is operating sub-optimally, according to certain embodiments.

FIG. 3 is a flow diagram illustrating a method 300 of error reporting to a host device, such as the host device 202 of FIG. 2, when a PCIe link, such as the PCIe link 224 of FIG. 2, is operating sub-optimally, according to certain embodiments. For exemplary purposes, aspects of the storage system 200 of FIG. 2 may be referenced herein.

At block 302, the data storage device 204 powers up. At block 304, the PCIe link between the controller 206 and the host device 202 is initialized. At block 306, the controller 206 determines if the PCIe link initialization is successful using the error detection module 210 disposed in the HIM 208. A successful PCIe link initialization may still include PCIe link errors. However, based on the amount and/or type of PCIe link errors, a quality of the PCIe link may be determined and compared to a threshold PCIe link quality. If the quality of the PCIe link is less than the threshold PCIe link quality at block 306, such that the PCIe link initialization was unsuccessful, then the error reporting module 212 raises an ALERT #signal via a sideband signal (e.g., the communication link 226) at block 308. At block 310, the error notification is sent to the host device 202, where the error notification may also include additional information regarding what happened that caused the PCIe link initialization to fail or what kind of errors are present in the PCIe link. At block 312, the host device 202 may retry the PCIe link initialization with different settings, such as resetting or adjusting an receiver (RX) equalizer, restart the PCIe link initialization process, or perform other applicable corrective actions.

If the PCIe link initialization was successful (i.e., greater than or equal to the threshold PCIe link quality) at block 306, then the error detection module 210 determines if there are any PCIe link errors observed at block 314. For example, PCIe link errors may arise from repeated transmissions of previously completed commands. If there are not any PCIe link errors observed at block 314, then method 300 proceeds to 316, where the data storage device was successfully powered up. However, if there are any PCIe link errors observed at block 314, then the error reporting module 212 raises an ALERT #signal via a sideband signal (e.g., the communication link 226) at block 308. At block 310, the error notification is sent to the host device 202, where the error notification may also include additional information regarding what happened that caused the PCIe link initialization to fail or what kind of errors are present in the PCIe link. At block 312, the host device 202 may retry the PCIe link initialization with different settings, such as resetting or adjusting an RX equalizer, restart the PCIe link initialization process, or perform other applicable corrective actions.

Figure 4:
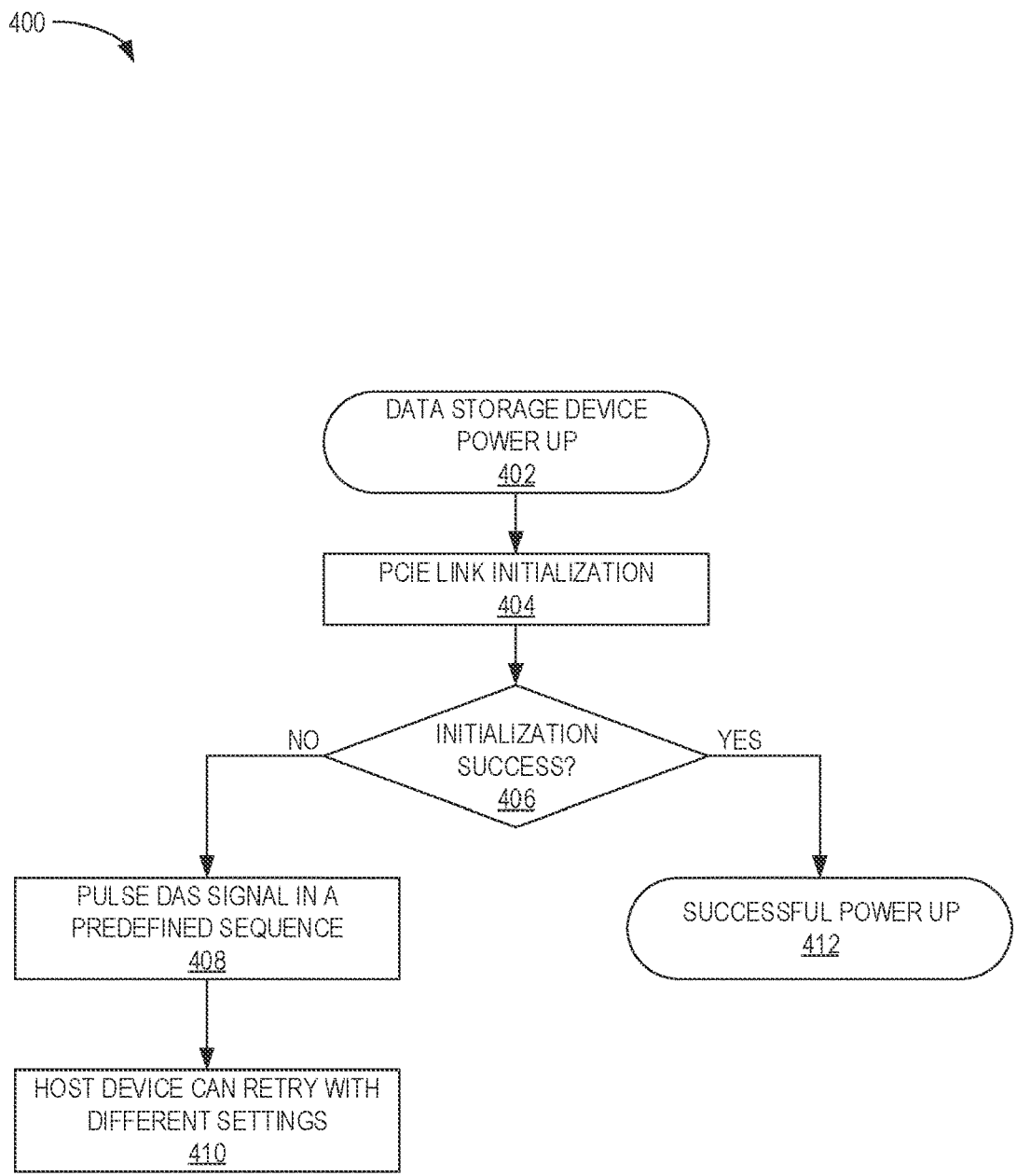
FIG. 4 is a flow diagram illustrating a method of error reporting to a host device when a PCIe link is operating sub-optimally, according to certain embodiments.

FIG. 4 is a flow diagram illustrating a method 400 of error reporting to a host device, such as the host device 202 of FIG. 2, when a PCIe link, such as the PCIe link 224 of FIG. 2, is operating sub-optimally, according to certain embodiments. For exemplary purposes, aspects of the storage system 200 of FIG. 2 may be referenced herein.

At block 402, the data storage device 204 powers up. At block 404, the PCIe link between the controller 206 and the host device 202 is initialized. At block 406, the controller 206 determines if the PCIe link initialization is successful using the error detection module 210 disposed in the HIM 208. A successful PCIe link initialization may still include PCIe link errors. However, based on the amount and/or type of PCIe link errors, a quality of the PCIe link may be determined and compared to a threshold PCIe link quality. If the quality of the PCIe link is less than the threshold PCIe link quality at block 406, such that the PCIe link initialization was unsuccessful, then the error reporting module 212 pulses a DAS signal in a predefined sequence via a sideband signal (e.g., the communication link 226) at block 408. It is to be understood that the predefined sequence may be previously provided to the host device 202 as a list of one or more predefined sequences, where each of the one or more predefined sequences corresponds to an error type, such that the host device 202 understands what kind of error has occurred based on the received predefined sequence. At block 410, the host device 202 may retry the PCIe link initialization with different settings, such as resetting or adjusting an RX equalizer, restart the PCIe link initialization process, or perform other applicable corrective actions. However, if the PCIe link initialization was successful at block 406, then the data storage device was successfully powered up at block 412.

By notifying a host device error conditions using a sideband channel/signal when a primary communication link (e.g., PCIe link) is inoperative or functionally sub-optimally, the ability to recover from errors occurring due to the degraded quality of the primary communication link may be improved, which may improve overall computing system quality.

In one embodiment, a data storage device includes a controller. The controller is coupled to a host device. The controller is configured to determine a quality of a peripheral component interconnect express (PCIe) link, wherein the quality of the PCIe link is either greater than or less than a threshold quality, and transmit an error notification to the host device via a sideband when the quality of the PCIe link is less than the threshold quality.

The determining the quality of the PCIe link comprises determining whether a PCIe link initialization is successful or unsuccessful after the PCIe link has been initialized. The controller is further configured to receive PCIe packets from the host device over a PCIe link when the PCIe link initialization is successful and determine whether the quality of the PCIe link is greater than or less than the threshold quality. The controller is further configured to determine that the quality of the PCIe link is less than the threshold quality and raise an alert signal to the host device via the sideband prior to transmitting the error notification. The sideband is a system management (SM) bus. The controller is further configured to, when the PCIe link initialization is unsuccessful, raise an alert signal to the host device via the sideband prior to transmitting the error notification. The sideband is a general purpose input/output (GPIO) signal. The transmitting the error notification comprises transmitting a predefined sequence of pulses via the GPIO signal to the host device when the PCIe link initialization is unsuccessful. The transmitting the error notification comprises transmitting a device status of the data storage device. The error notification comprises one or more of error codes associated with the quality of the PCIe link, an indication to recalibrate a receiver (RX) equalizer, an indication to reinitialize the PCIe link, and PCIe diagnostic data.

In another embodiment, a data storage device includes a controller. The controller is coupled to a host device. The controller includes an error detection module and an error reporting module coupled to the error detection module. The error detection module is configured to detect transmission errors in a peripheral component interconnect express (PCIe) link between the host device and the data storage device. The error reporting module is configured to collect the detected transmission errors from the error detection module, determine a quality of the PCIe link based on the collected detected transmission errors, wherein the quality of the PCIe link is either greater than or less than a threshold quality, and transmit an error notification to the host device through a sideband when the quality of the PCIe link is less than the threshold quality.

The controller comprises one or more processors. The one or more processors is configured to add additional information regarding events occurring in the data storage device resulting in the quality of the PCIe link. The sideband is either a system management (SM) bus, a distributed antenna system (DAS) signal, a general purpose input/output (GPIO) signal, or an improved inter-integrated circuit (I3C) signal. The error notification is able to be transmitted to the host device when the data storage device appears to be unresponsive to the host device. The detected transmission errors corresponds to receiving one or more PCIe packets that have been responded to previously. The controller further comprises a host interface module (HIM). The error detection module is disposed in the HIM. The error reporting module is external to the HIM.

In another embodiment, a data storage device includes means for detecting a quality of a peripheral component interconnect express (PCIe) link between the data storage device and a host device coupled to the data storage device and means for transmitting an error notification to the host device via a sideband distinct from the PCIe link.

The means for transmitting the error notification comprises means for raising an alert signal and means for sending error codes corresponding to the error notification. The means for transmitting the error notification comprises means for pulsing a sideband signal in a predefined sequence corresponding to the error notification.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a controller, wherein the controller is coupled to a host device, wherein the controller is configured to:
  determine a quality of a peripheral component interconnect express (PCIe) link, wherein the quality of the PCIe link is either greater than or less than a threshold quality;
  send an alert signal to the host device via a sideband when the quality of the PCIe link is less than the threshold quality; and
  transmit an error notification to the host device via the sideband after sending the alert signal, wherein transmitting the error notification comprises transmitting a device status of the data storage device via pulsing a distributed antenna system (DAS) signal in a predefined sequence, and wherein the predefined sequence indicates to the host device a corresponding error code.

2. The data storage device of claim 1, wherein determining the quality of the PCIe link comprises determining whether a PCIe link initialization is successful or unsuccessful after the PCIe link has been initialized.

3. The data storage device of claim 2, wherein the controller is further configured to
 receive PCIe packets from the host device over a PCIe link when the PCIe link initialization is successful.

4. The data storage device of claim 1, wherein the sideband is a system management (SM) bus.

5. The data storage device of claim 2, wherein the controller is further configured to, when the PCIe link initialization is unsuccessful, raise an alert signal to the host device via the sideband prior to transmitting the error notification.

6. The data storage device of claim 2, wherein the sideband is a general purpose input/output (GPIO) signal.

7. The data storage device of claim 6, wherein transmitting the error notification comprises transmitting a predefined sequence of pulses via the GPIO signal to the host device when the PCIe link initialization is unsuccessful.

8. The data storage device of claim 1, wherein the error notification comprises one or more of error codes associated with the quality of the PCIe link, an indication to recalibrate a receiver (RX) equalizer, an indication to reinitialize the PCIe link, and PCIe diagnostic data.

9. The data storage device of claim 1, wherein the corresponding error code is associated with the quality of the PCIe link.

10. The data storage device of claim 1, wherein the corresponding error code is associated with an indication to recalibrate a receiver (RX) equalizer.

11. The data storage device of claim 1, wherein the corresponding error code is associated with an indication to reinitialize the PCIe link.

12. The data storage device of claim 1, wherein the corresponding error code is an error code associated with a PCIe diagnostic data.

13. A data storage device, comprising:
 a controller, wherein the controller is coupled to a host device, wherein the controller comprises:

a host interface module (HIM);
an error detection module disposed in the HIM, configured to:
   detect transmission errors in a peripheral component interconnect express (PCIe) link between the host device and the data storage device, wherein detecting transmission errors comprises receiving one or more PCIe packets that have been responded to previously; and
an error reporting module disposed external to the HIM and coupled to the error detection module, wherein the error reporting module is configured to:
   collect the detected transmission errors from the error detection module;
   determine a quality of the PCIe link based on the collected detected transmission errors, wherein the quality of the PCIe link is either greater than or less than a threshold quality;
   send an alert signal to the host device via a sideband when the quality of the PCIe link is less than the threshold quality; and
   transmit an error notification to the host device through the sideband after sending the alert signal, wherein transmitting the error notification comprises transmitting a device status of the data storage device via pulsing a signal in a predefined sequence, and wherein the predefined sequence indicates to the host device a corresponding error type.

14. The data storage device of claim 13, wherein the controller comprises one or more processors, and wherein the one or more processors is configured to add additional information regarding events occurring in the data storage device resulting in the quality of the PCIe link.

15. The data storage device of claim 13, wherein the sideband is either a system management (SM) bus, a distributed antenna system (DAS) signal, a general purpose input/output (GPIO) signal, or an improved inter-integrated circuit (I3C) signal.

16. The data storage device of claim 13, wherein the error notification is able to be transmitted to the host device when the data storage device appears to be unresponsive to the host device.

17. A data storage device, comprising:
   means for detecting a quality of a peripheral component interconnect express (PCIe) link between the data storage device and a host device coupled to the data storage device;
   means for sending an alert signal to the host device via a sideband distinct from the PCIe link when the quality of the PCIe link is less than a threshold quality; and
   means for transmitting an error notification to the host device via the sideband after the alert signal is sent, wherein means for transmitting the error notification comprises transmitting a device status of the data storage device via pulsing a distributed antenna system (DAS) signal in a predefined sequence, and wherein the predefined sequence indicates to the host device a corresponding error type.

18. The data storage device of claim 17, wherein the means for transmitting the error notification comprises: means for sending error codes corresponding to the error notification.

* * * * *